United States Patent
Zhao et al.

(10) Patent No.: US 10,775,751 B2
(45) Date of Patent: Sep. 15, 2020

(54) AUTOMATIC GENERATION OF REGULAR EXPRESSION BASED ON LOG LINE DATA

(71) Applicant: AppDynamics LLC, San Francisco, CA (US)

(72) Inventors: Yuchen Zhao, Belmont, CA (US); Nima Haddadkaveh, San Francisco, CA (US); Arjun Iyer, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 858 days.

(21) Appl. No.: 15/011,040

(22) Filed: Jan. 29, 2016

(65) Prior Publication Data

US 2017/0220218 A1 Aug. 3, 2017

(51) Int. Cl.
| | | |
|---|---|---|
| *G05B 15/02* | (2006.01) | |
| *G06F 16/95* | (2019.01) | |
| *G06F 17/40* | (2006.01) | |
| *G06F 11/30* | (2006.01) | |

(52) U.S. Cl.
CPC .......... *G05B 15/02* (2013.01); *G06F 16/95* (2019.01); *G06F 17/40* (2013.01); *G06F 11/302* (2013.01); *G06F 11/3003* (2013.01); *G06F 11/3006* (2013.01); *G06F 2201/865* (2013.01); *G06F 2201/875* (2013.01)

(58) Field of Classification Search
CPC .. G06F 17/40; G06F 11/0778; G06F 11/3452; G06F 11/3476; G06F 17/3043; G06F 17/30598; G06F 16/95; G06F 11/3003; G06F 11/302; G06F 11/3006; G06F 2201/865; G06F 2201/875; G05B 15/02
See application file for complete search history.

(56) References Cited

U.S. PATENT DOCUMENTS

| | | | |
|---|---|---|---|
| 7,895,611 B2 * | 2/2011 | Grabarnik | G06F 8/427 |
| | | | 706/47 |
| 9,633,106 B1 * | 4/2017 | Saurabh | G06F 17/3071 |
| 9,760,551 B2 * | 9/2017 | Luo | G06F 17/2282 |
| 2005/0080763 A1 * | 4/2005 | Opatowski | G06F 8/20 |
| 2005/0138483 A1 * | 6/2005 | Hatonen | G06F 11/3466 |
| | | | 714/45 |
| 2009/0282391 A1 * | 11/2009 | Gutierrez | G06F 8/10 |
| | | | 717/128 |
| 2014/0282031 A1 * | 9/2014 | Hinterbichler | G06F 11/3656 |
| | | | 715/738 |

(Continued)

*Primary Examiner* — Andrew L Tank
(74) *Attorney, Agent, or Firm* — Behmke Innovation Group LLC; James M. Behmke; James J. Wong (57) ABSTRACT

In one aspect, a regular expression is automatically generated based on user input for fields that are desired to be extracted from log lines. The input may be received by user through an interface provided by a machine such as a controller. The input may identify one or more fields within a log line that should be extracted. Multiple instances of potential regular expression portions may be generated based on the user input, and different portions are combined together to determine if they achieve the desired extraction. Once a complete regular expression is generated based on user input, a user may provide additional input to identify examples or counterexamples of log line fields that satisfy or don't satisfy the user's intended extraction.

21 Claims, 11 Drawing Sheets

(56) References Cited

U.S. PATENT DOCUMENTS

| | | | |
|---|---|---|---|
| 2015/0039651 A1* | 2/2015 | Kinsely | G06F 17/30563 |
| | | | 707/779 |
| 2015/0220605 A1* | 8/2015 | Syed | G06F 17/40 |
| | | | 707/776 |
| 2017/0063886 A1* | 3/2017 | Muddu | H04L 63/1425 |

* cited by examiner

AUTOMATIC GENERATION OF REGULAR EXPRESSION BASED ON LOG LINE DATA

BACKGROUND

The World Wide Web has expanded to provide numerous web services to consumers. The web services may be provided by a web application which uses multiple services and applications to handle a transaction. The applications may be distributed over several machines, making the topology of the machines that provide the service more difficult to track and monitor.

Monitoring a web application helps to provide insight regarding bottle necks in communication, communication failures and other information regarding performance of the services that provide the web application. Monitoring a web application may include monitoring log lines produced by one or more applications that provide a web application. Typically, extremely large quantities of log lines are generated by log managers of applications, for example in the range of terabytes per day. As such, it can be very difficult if not impossible to manually review and analyze such a large number of log lines.

One method for retrieving data from log lines is by use of a regular expression. A regular expression is a sequence of characters that define a search pattern, for example for use in pattern matching with strings. A regular expression, or "regex," can be very difficult to read by human operators, and may be even more difficult to generate by a human operator. Generating a regular expression typically takes many hours for actual data.

SUMMARY

The present technology, roughly described, automatically generates a regular expression based on user input for fields that are desired to be extracted from log lines. The user input may be received from a user through an interface provided by a machine such as a controller. The user input may identify one or more fields within a log line that should be extracted. Multiple instances of potential regular expression portions may be generated based on the user input, and different portions are combined together to determine if they achieve the desired extraction. Once a complete regular expression is generated based on user input, a user may provide additional input to identify examples or counterexamples of log line fields that satisfy or don't satisfy the user's intended extraction. Generation of a regular expression is performed automatically based on user input, providing an easy to use mechanism for a user to specify what to extract without having to generate a regular expression manually.

Some implementations may include a method for automatically generating a regular expression from log line data. The method can identify a portion of a log line in the log line data by an application on a server. Multiple instances of multiple portions of a regular expression may be automatically generated by the application as part of the method on the server based on the identified portion. A regular expression may be automatically generated by the application on the server from one or more of the generated instances of the multiple instances. Log lines may be retrieved by the application on the server based on the automatically generated regular expression.

Some implementations may include a system for automatically generating a regular expression from log line data. The system may include a processor, memory, and one or more modules stored in memory and executable by the processor. When executed, the modules may identify a portion of a log line on a server, automatically generate multiple instances of multiple portions of a regular expression on the server based on the identified portion, automatically generate a regular expression by the application on the server from one or more of the generated instances of the multiple instances, and retrieve log lines by the application on the server based on the automatically generated regular expression.

DETAILED DESCRIPTION

The present technology, roughly described, automatically generates a regular expression based on user input for fields that are desired to be extracted from log lines. The user input may be received from a user through an interface provided by a machine such as a controller. The user input may identify one or more fields within a log line that should be extracted. Multiple instances of potential regular expression portions may be generated based on the user input, and different portions are combined together to determine whether the different portions achieve the desired extraction. Once a complete regular expression is generated based on user input, a user may provide additional input to identify examples or counterexamples of log line fields that satisfy or don't satisfy the user's intended extraction. Generation of a regular expression is performed automatically based on user input, providing an easy to use mechanism for a user to specify what to extract without having to generate a regular expression manually.

Figure 1:
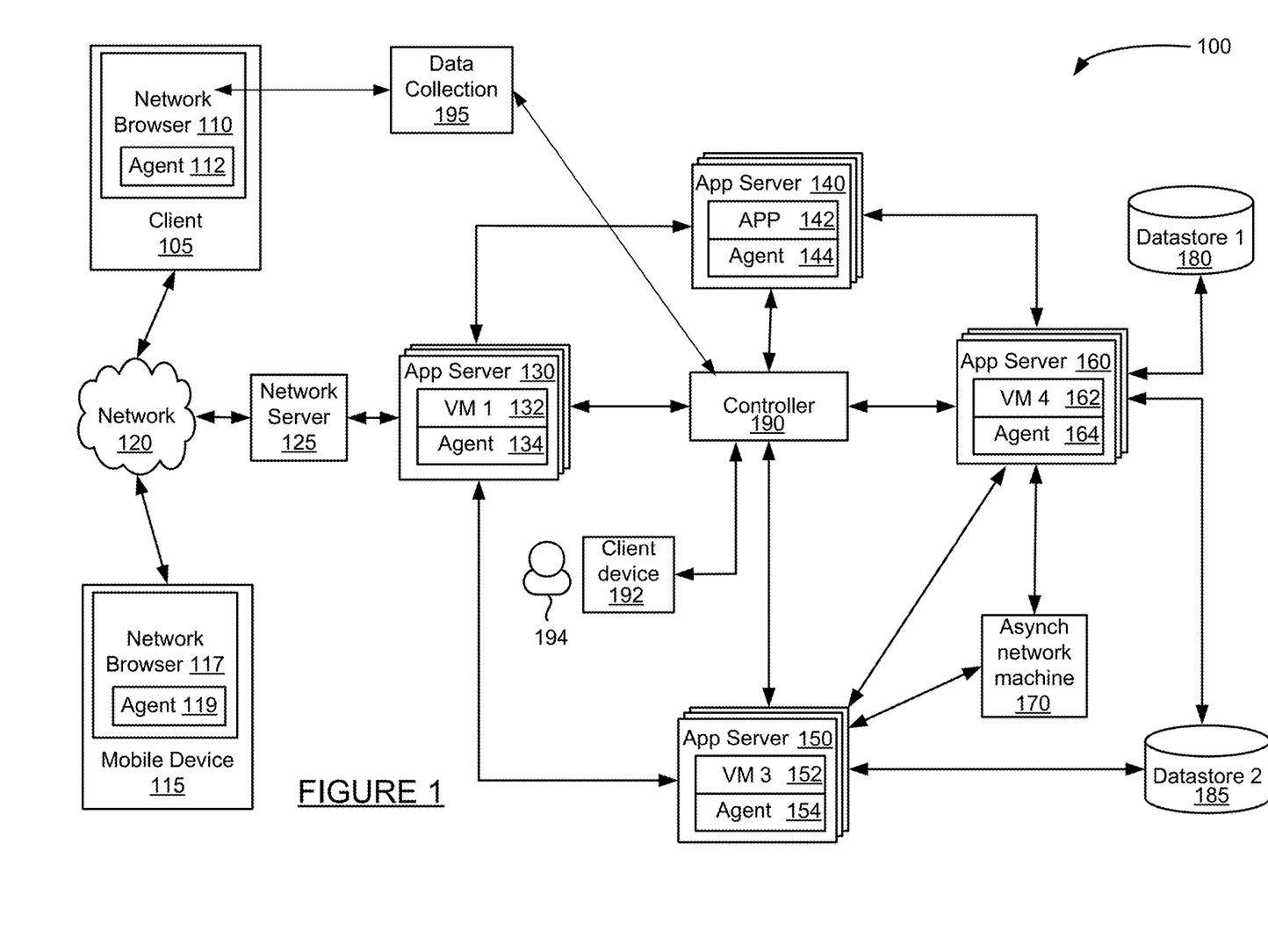
FIG. 1 is a block diagram of an exemplary system for generating a regular expression for extracting fields from log lines.

FIG. 1 is an exemplary block diagram of a system for generating a regular expression for extracting fields from log lines. System 100 of FIG. 1 includes client device 105 and 192, mobile device 115, network 120, network server 125, application servers 130, 140, 150 and 160, asynchronous network machine 170, data stores 180 and 185, controller 190, and data collection server 195.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120.

Network browser 110 may include agent 112. Agent 112 may be installed on network browser 110 and/or client 105 as a network browser add-on, downloading the application to the server, or in some other manner. Agent 112 may be executed to monitor network browser 110, the operation system of client 105, and any other application, API, or other component of client 105. Agent 112 may determine network browser navigation timing metrics, access browser cookies, monitor code, and transmit data to data collection 160, controller 190, or another device. Agent 112 may perform other operations related to monitoring a request or a network at client 105 as discussed herein.

Mobile device 115 is connected to network 120 and may be implemented as a portable device suitable for sending and receiving content over a network, such as for example a mobile phone, smart phone, tablet computer, or other portable device. Both client device 105 and mobile device 115 may include hardware and/or software configured to access a web service provided by network server 125.

Mobile device 115 may include network browser 117 and an agent 119. Mobile device may also include client applications and other code that may be monitored by agent 119. Agent 119 may reside in and/or communicate with network browser 117, as well as communicate with other applications, an operating system, APIs and other hardware and software on mobile device 115. Agent 119 may have similar functionality as that described herein for agent 112 on client 105, and may report data to data collection server 160 and/or controller 190.

Network 120 may facilitate communication of data between different servers, devices and machines of system 100 (some connections shown with lines to network 120, some not shown). The network may be implemented as a private network, public network, intranet, the Internet, a cellular network, Wi-Fi network, VoIP network, or a combination of one or more of these networks. The network 120 may include one or more machines such as load balance machines and other machines.

Network server 125 is connected to network 120 and may receive and process requests received over network 120. Network server 125 may be implemented as one or more servers implementing a network service, and may be implemented on the same machine as application server 130 or one or more separate machines. When network 120 is the Internet, network server 125 may be implemented as a web server.

Application server 130 communicates with network server 125, application servers 140 and 150, and controller 190. Application server 130 may also communicate with other machines and devices (not illustrated in FIG. 1). Application server 130 may host an application or portions of a distributed application. The host application 132 may be in one of many platforms, such as including a Java, PHP, .Net, and Node.JS, be implemented as a Java virtual machine, or include some other host type. Application server 130 may also include one or more agents 134 (e.g. "modules"), including an application agent, machine agent, and network agent, and other software modules. Application server 130 may be implemented as one server or multiple servers as illustrated in FIG. 1.

Application 132 and other software on application server 130 may be instrumented using byte code insertion, or byte code instrumentation (BCI), to modify the object code of the application or other software. The instrumented object code may include code used to detect calls received by application 132, calls sent by application 132, and communicate with agent 134 during execution of the application. BCI may also be used to monitor one or more sockets of the application and/or application server in order to monitor the one or more sockets and capture packets coming over the one or more sockets.

In some embodiments, server 130 may include applications and/or code other than a virtual machine. For example, server 130 may include Java code, .Net code, PHP code, Ruby code, C code or other code to implement applications and process requests received from a remote source.

Agents 134 on application server 130 may be installed, downloaded, embedded, or otherwise provided on application server 130. For example, agents 134 may be provided in server 130 by instrumentation of object code, downloading the agents to the server, or in some other manner. Agents 134 may be executed to monitor application server 130, monitor code running in a or a virtual machine 132 (or other program language, such as a PHP, .Net, or C program), machine resources, network layer data, and communicate with byte instrumented code on application server 130 and one or more applications on application server 130.

Each of agents 134, 144, 154 and 164 may include one or more agents, such as an application agents, machine agents, and network agents. An application agent may be a type of agent that is suitable to run on a particular host. Examples of application agents include a JAVA agent, .Net agent, PHP agent, and other agents. The machine agent may collect data from a particular machine on which it is installed. A network agent may capture network information, such as data collected from a socket. Agents are discussed in more detail below with respect to FIG. 2.

Agent 134 may detect operations such as receiving calls and sending requests by application server 130, resource usage, and incoming packets. Agent 134 may receive data, process the data, for example by aggregating data into metrics, and transmit the data and/or metrics to controller 190. Agent 134 may perform other operations related to monitoring applications and application server 130 as discussed herein. For example, agent 134 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

Figure 2:
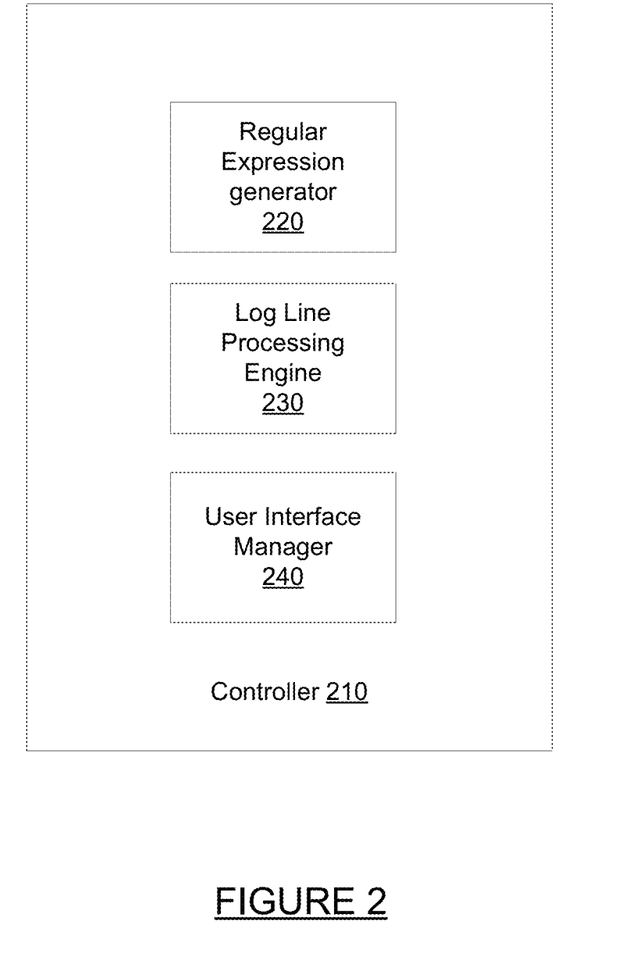
FIG. 2 is a block diagram of an exemplary controller that automatically generates a regular expression.

An application agent may be an agent suitable to instrument or modify, collect data from, and reside on a host. The host may be a Java, PHP, .Net, Node.JS, or other type of platform. Application agent 220 may collect flow data as well as data associated with the execution of a particular application. The application agent may instrument the lowest level of the application to gather the flow data. The flow data may indicate which tier is communicating which with which tier and on which port. In some instances, the flow data collected from the application agent includes a source IP, a source port, a destination IP, and a destination port. The application agent may report the application data and call chain data to a controller. The application agent may report the collected flow data associated with a particular application to network agent 230.

A network agent may be a standalone agent that resides on the host and collects network flow group data. The network flow group data may include a source IP, destination port, destination IP, and protocol information for network flow received by an application on which network agent 230 is installed. The network agent 230 may collect data by intercepting and performing packet capture on packets coming in from a one or more sockets. The network agent may receive flow data from an application agent that is associated with applications to be monitored. For flows in the flow group data that match flow data provided by the application agent, the network agent rolls up the flow data to determine metrics such as TCP throughput, TCP loss, latency and bandwidth. The network agent may then reports the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the application agent, network agent, and machine agent may report data to the controller. Controller 210 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 134 may create a request identifier for a request received by server 130 (for example, a request received by a client 105 or 115 associated with a user or another source). The request identifier may be sent to client 105 or mobile device 115, whichever device sent the request. In embodiments, the request identifier may be created when a data is collected and analyzed for a particular business transaction. Additional information regarding collecting data for analysis is discussed in U.S. patent application Ser. No. 12/878,919, titled "Monitoring Distributed Web Application Transactions," filed on Sep. 9, 2010, U.S. Pat. No. 8,938,533, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, the disclosures of which are incorporated herein by reference.

Each of application servers 140, 150 and 160 may include an application and agents. Each application may run on the corresponding application server. Each of applications 142, 152 and 162 on application servers 140-160 may operate similarly to application 132 and perform at least a portion of a distributed business transaction. Agents 144, 154 and 164 may monitor applications 142-162, collect and process data at runtime, and communicate with controller 190. The applications 132, 142, 152 and 162 may communicate with each other as part of performing a distributed transaction. In particular each application may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. In some embodiments, controller 190 may receive application data, including data associated with monitoring client requests at client 105 and mobile device 115, from data collection server 160. In some embodiments, controller 190 may receive application monitoring data and network data from each of agents 112, 119, 134, 144 and 154. Controller 190 may associate portions of business transaction data, communicate with agents to configure collection of data, and provide performance data and reporting through an interface. The interface may be viewed as a web-based interface viewable by client device 192, which may be a mobile device, client device, or any other platform for viewing an interface provided by controller 190. In some embodiments, a client device 192 may directly communicate with controller 190 to view an interface for monitoring data.

Client device 192 may include any computing device, including a mobile device or a client computer such as a desktop, work station or other computing device. Client computer 192 may communicate with controller 190 to create and view a custom interface. In some embodiments, controller 190 provides an interface for creating and viewing the custom interface as a content page, e.g., a web page, which may be provided to and rendered through a network browser application on client device 192.

Applications 132, 142, 152 and 162 may be any of several types of applications. Examples of applications that may implement applications 132-162 include a Java, PHP, .Net, Node.JS, and other applications.

FIG. 2 is an exemplary block diagram of a controller that automatically generates a regular expression. The controller 210 of FIG. 2 illustrates more detail for controller 190 the system of FIG. 1. Controller 210 may include one or more modules such as regular expression generator 220, log line processing engine 230, and user interface manager 240. Additional or fewer modules other than modules 220-240 may be implemented within controller 210 to perform the functionality discussed herein. In some instances, the modules can be implemented by a single application executing on the server which provides the controller.

Regular expression generator 220 may generate a regular expression. Generator 220 may generate a regular expression based at least in part on input received from a user of a field within a log line. The input may be received through a user interface provided by user interface manager 240, provided to a browser network or client application on a remote machine. Expression generator 220 may generate a regular expression, access templates to generate regular expressions, and combine portions of a regular expression to form a complete regular expression.

Log line processing engine 230 may access and apply regular expressions to log lines. Log line processing engine may parse a log line, provide log lines to display within user interface manager 240, and perform other functionality related to a log line.

User interface manager 240 may construct a content page or other interface provided to a user. In some instances, the content page may be provided to a user through network browser 110 of client 105 in the system of FIG. 1. User interface manager may also receive and process inputs received through an interface provided to a user, and invoke other applications and functionality based on the input received.

Figure 3:
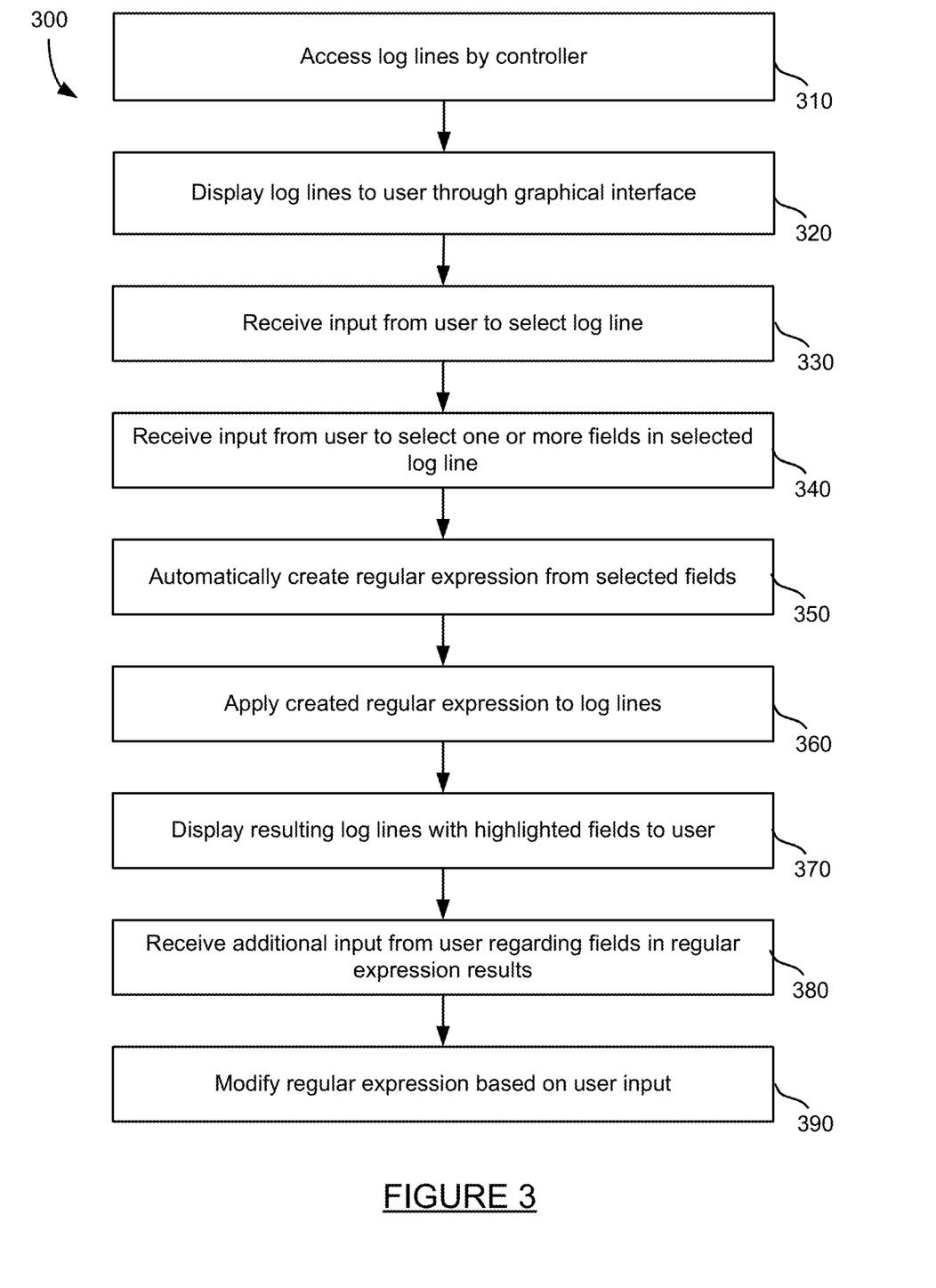
FIG. 3 is an exemplary method for automatically generating a regular expression.

FIG. 3 is an exemplary method for automatically generating a regular expression. Log lines may be accessed by controller 210 at step 310. The log lines may be accessed from a variety of log lines provided to controller 190 by one or more agents hosted on servers within FIG. 1. The controller may initially receive the log lines, store the log lines, and then access them when needed at step 310. Log lines may then be displayed to a user through a graphical interface at step 320. The displayed log lines may include a sampling of log lines deemed important to a user, log lines associated with an anomaly brought to the attention of the user, or other log lines. The log line display may include the log lines within a list provided through a graphical interface.

Figure 8:
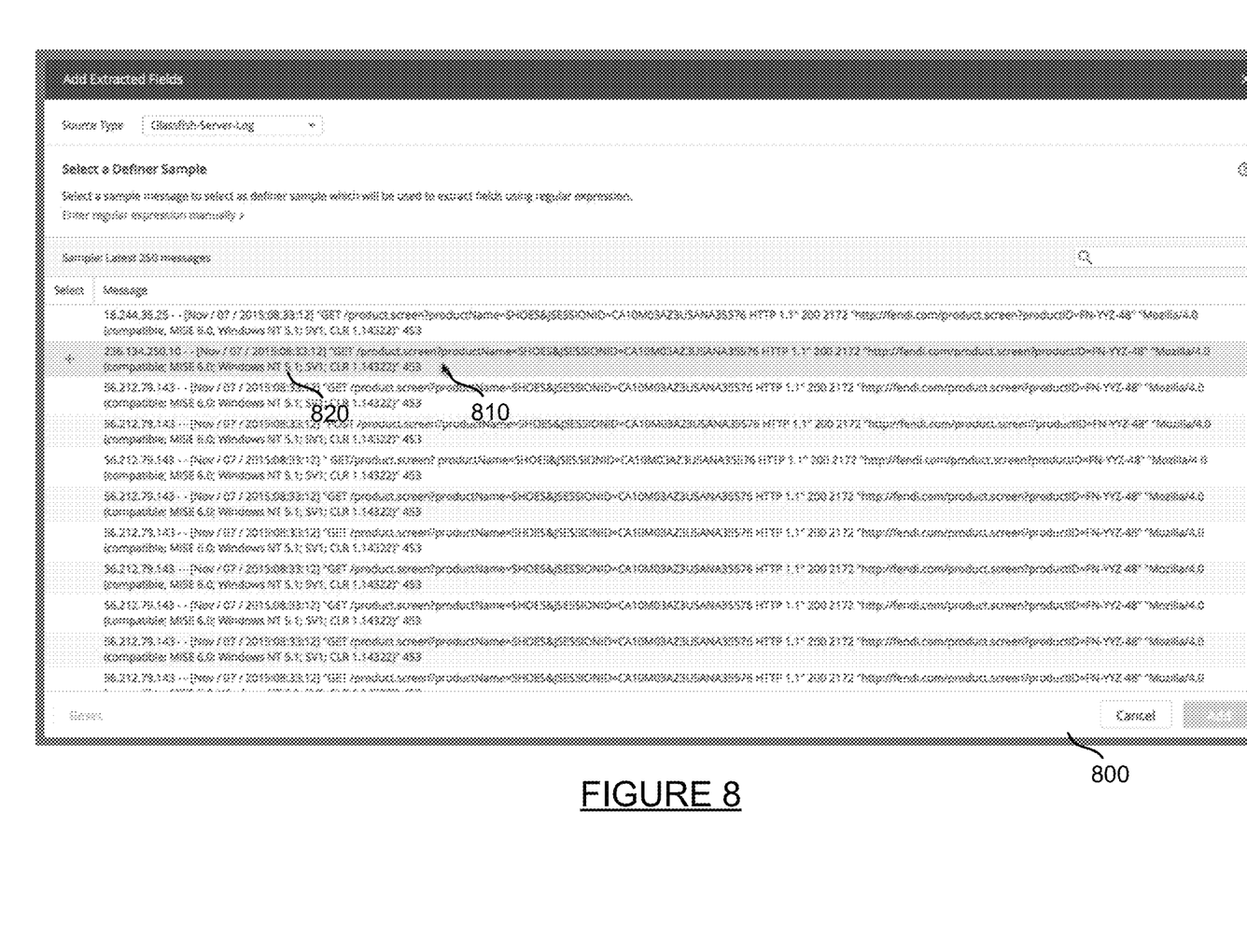
FIG. 8 illustrates an exemplary interface for selecting a log line.

Input input is received from a user to select a log line at step 330. The user input may be received by selection of a particular log line from a plurality of log lines. FIG. 8 illustrates an exemplary interface for selecting a log line. In the interface of FIG. 8, a plurality of log lines are shown to illustrate one example. A user may manipulate cursor 810 over a particular log line 820 in order to select the log line. As shown in the interface of FIG. 8, cursor 810 is positioned over the second log line 820 and that log line is highlighted, confirming that the log line is currently selected.

Input is received from user to select a log line at step 330. The input may include a right-click or some other input received by an interface provided by a network browser, client application, or other application that provides a user interface with selectable log lines. Once a user has provided input to select a log line, the user input is then received from the user to select one or more fields within the selected log line at step 340. The user may select one or more fields of a log line in order to have a regular expression automatically generated based on those selected fields. The selection may be made in any of several ways, including detecting a positioning of a cursor over a particular field of the log line and entering data regarding the selected field.

Figure 9:
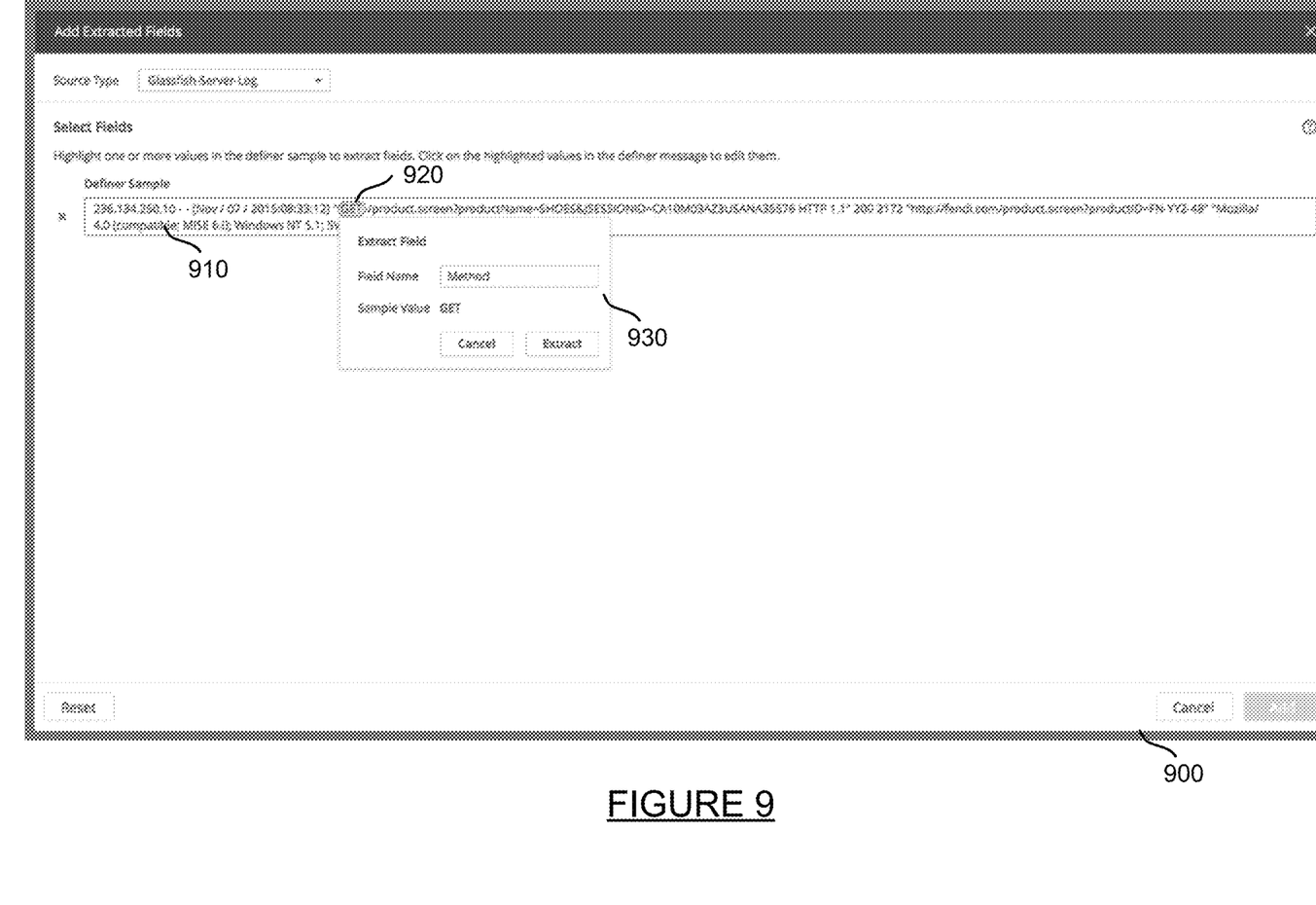
FIG. 9 illustrates an exemplary interface for selecting a field in a log line from which to build a regular expression.

FIG. 9 illustrates an interface for selecting a field in a log line from which to build a regular expression. In interface 900 of FIG. 9, log line 910 has been selected and a field 920 of "GET" has been selected within the log line. Interface 930 within the interface 900 may be provided to a user so the user can provide a name regarding the field to extract.

Regular expressions may be automatically created from the selected fields at step 350. Automatically creating a regular expression may include identifying selected fields and gaps within a log line, creating regular expressions for individual selected fields, creating a regular expression for each gap, and determining a combination of regular expression portions that achieve the field extraction desired by a user. More detail for automatically creating a regular expression from selected fields is discussed with respect to the method of FIG. 4.

A regular expression is applied to log lines at step 360. A number of log lines will be provided which are intended to illustrate how well the regular expression extracts fields. In particular, in each log line to which the regular expression is applied, the fields extracted from the regular expression will be highlighted at step 370. Additional input may be received from user regarding the regular expression extractions at step 380. A user may indicate examples of extracted fields within the log lines as well as provide counterexamples of extractions within log lines that do not meet the desired extractions as intended by the user.

Figure 10:
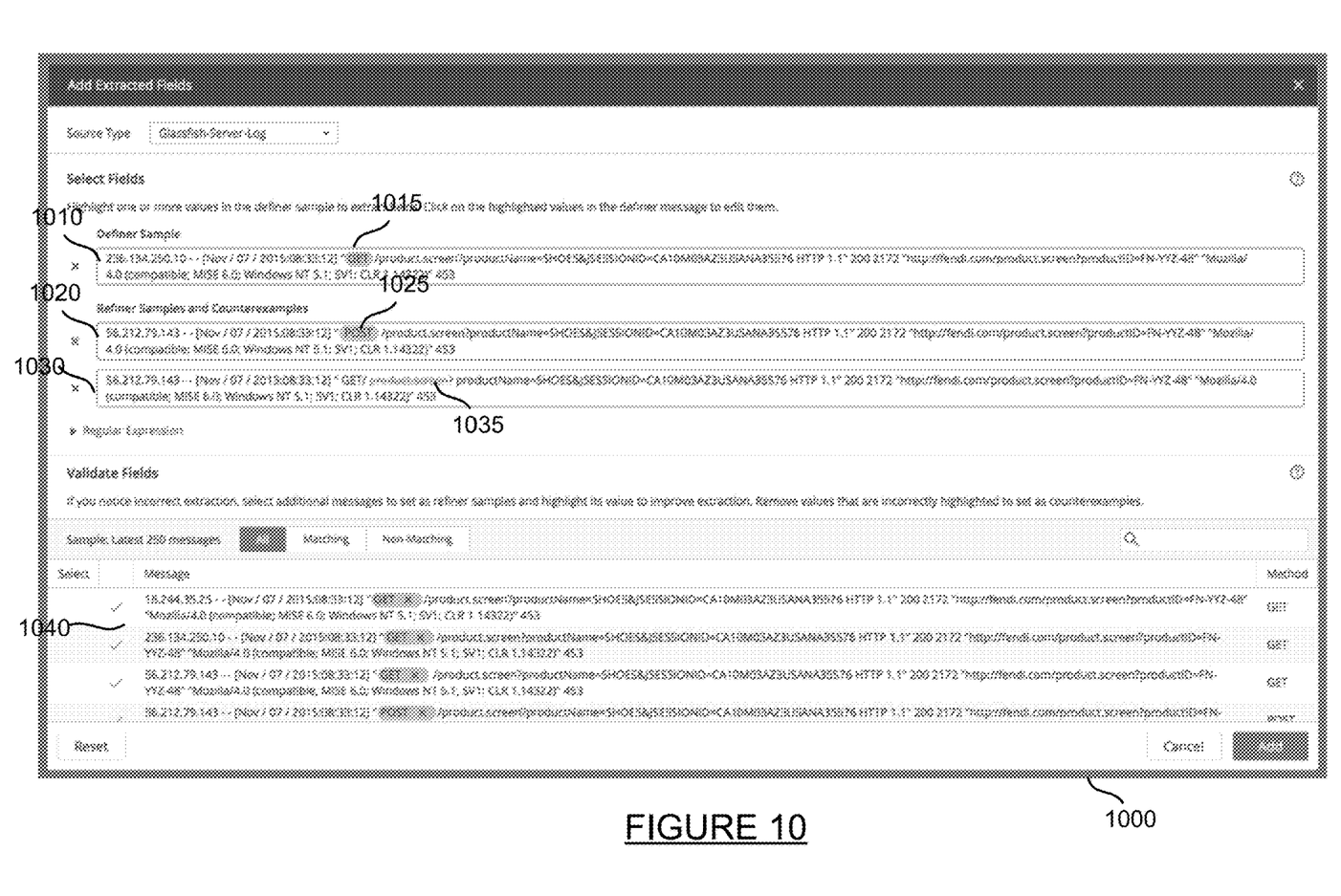
FIG. 10 illustrates an exemplary interface for selecting a modification sample or counterexample for a registered expression.

An example of an interface for receiving additional input from user regarding fields in regular expressions is provided in FIG. 10. In FIG. 10, interface 1000 includes definer sampled log line 1010, a refinery sample 1020, and a counterexample 1030. Definer example 1010 includes a highlighted field 1015 originally identified by a user from which to generate a regular expression. Refinery example 1020 includes a highlighted field of 1025, which can be used to clarify a regular expression used to extract fields from log lines. Counterexample 1030 includes a portion 1035 which a user has identified should not be extracted in any log line identified by the regular expression developed by definer sample 1010 and refinery sample 1020.

Figure 11:
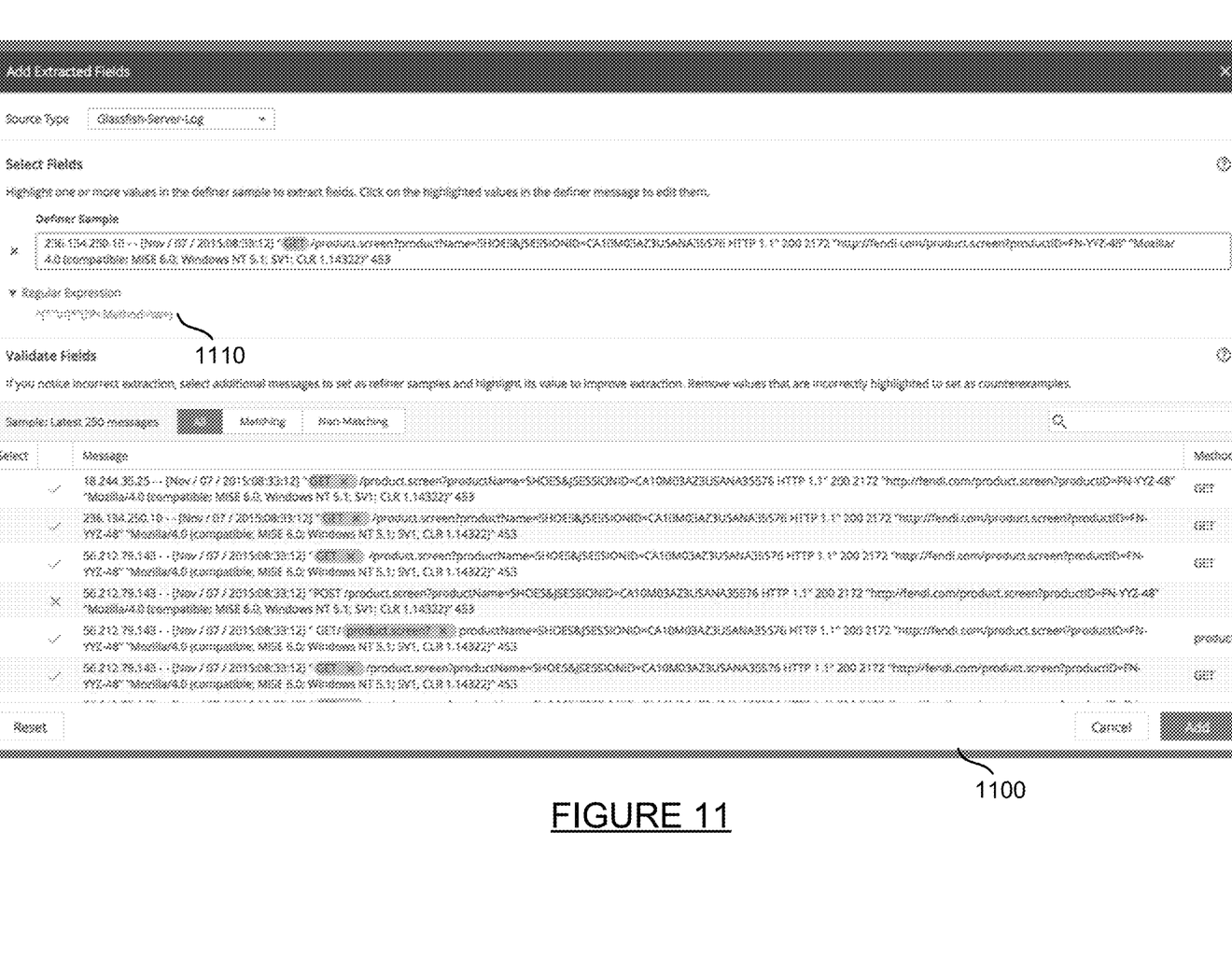
FIG. 11 illustrates an exemplary interface for providing the user with a registered expression.

A regular expression may be modified based on user input at step 390. After receiving a definer sample, refiner sample, and counterexample, a regular expression may be provided to a user within an interface. In the interface of FIG. 11, interface 1100 shows a regular expression 1110 being provided to a user. The regular expression is presented as "^["'"\n ]* "(?P<Method.\w+)".

Figure 4:
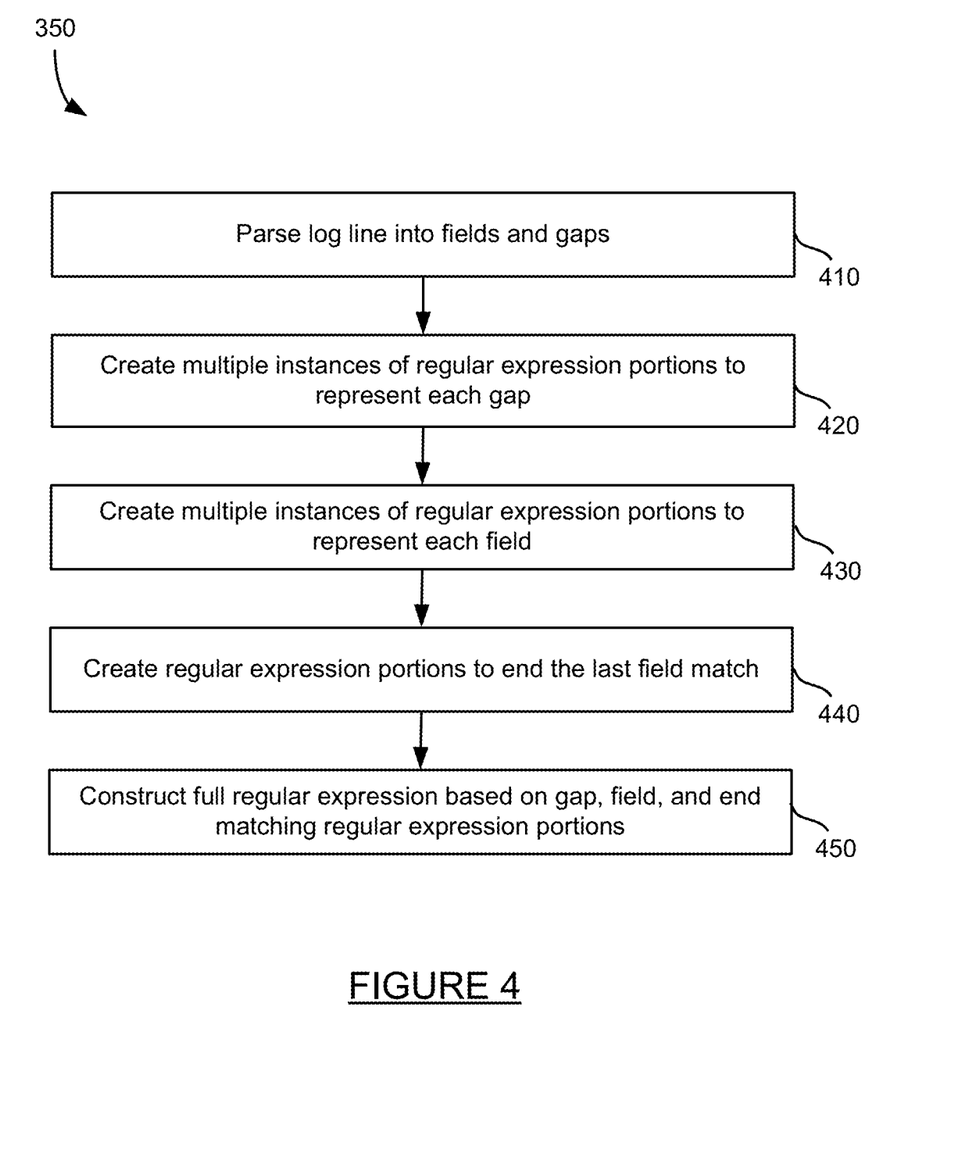
FIG. 4 is an exemplary method for automatically creating regular expressions from selected fields.

FIG. 4 is an examplary method for automatically creating regular expressions from selected fields. The method of FIG. 4 provides more detail for step 350 of the method of FIG. 3. First, log lines are parsed into fields and gaps at step 410. Multiple instances of a regular expression portion may then be created to represent each gap at step 420. Multiple instances may be determined in a variety of ways, such as by patterns, common fields, and delimiters. Creating multiple instances of a regular expression portion to represent a gap is discussed in more detail with respect to the method of FIG. 5.

Multiple instances of a regular expression portion are created to represent each field at step 430. Similar to gaps, multiple methods may be used to create instances of a regular expression to represent a field. These may include prebuilt patterns, strings and patterns, and delimiters. More detail for creating multiple instances of a regular expression portion to represent each field is discussed with respect to the method of FIG. 6.

Regular expression portions may be created to end the last field match at step 440. Regular expression portions to end the last field match may include generating expressions that extract a field based on a match of the last field in a log line. After creating last field matching regular expression portions, a full regular expression may be constructed based on gap, field, and matching regular expression portions at step 450. Details for constructing a full regular expression based on regular expression portions is discussed in more detail with respect to the method of FIG. 7.

Figure 5:
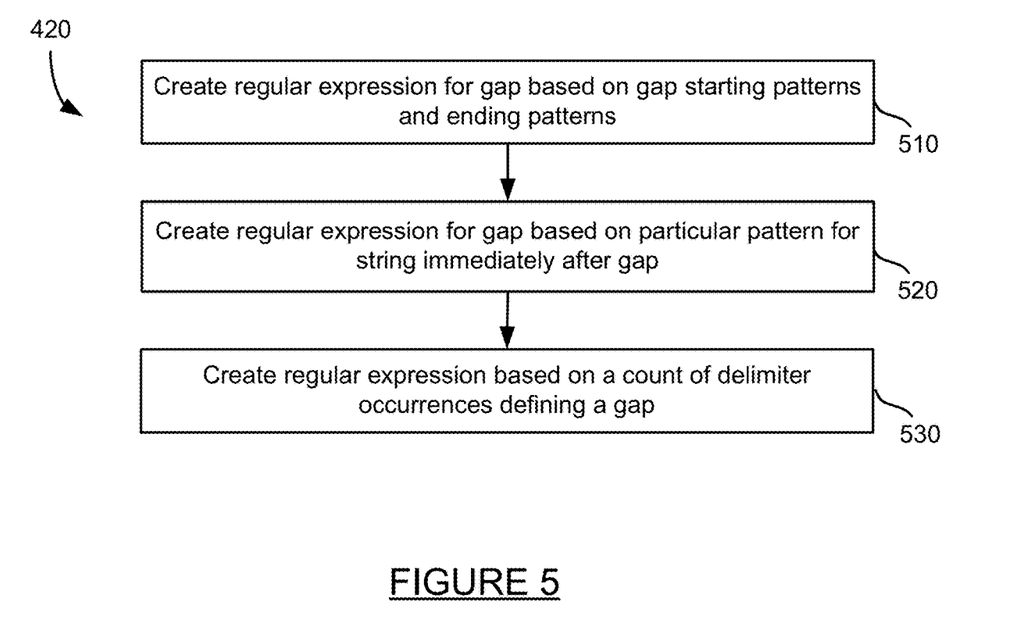
FIG. 5 is an exemplary method for creating multiple instances of a regular expression portions to represent a gap.

FIG. 5 is an exemplary method for creating multiple instances of a regular expression portion to represent a gap. Method of FIG. 5 provides more detail for step 420 the method of FIG. 4. A regular expression is created for a gap based on gap starting patterns and ending patterns at step 510. For example, a certain string may be found before a particular gap and after a particular gap for each gap in a log line. A regular expression is generated for each pattern and for each gap. A regular expression is also created for a gap based on a particular pattern for the string immediately after the gap at step 520. Rather than identifying a pattern, a regular expression is generated for the string immediately after a particular gap for each gap in a log line. A regular expression may also be created based on a count of delimiter occurrences defining a particular gap at step 530. The count of delimiter occurrences may include a number of delimiters occurring before the particular gap within the log line. This count may be determined for each gap within a particular log line.

Figure 6:
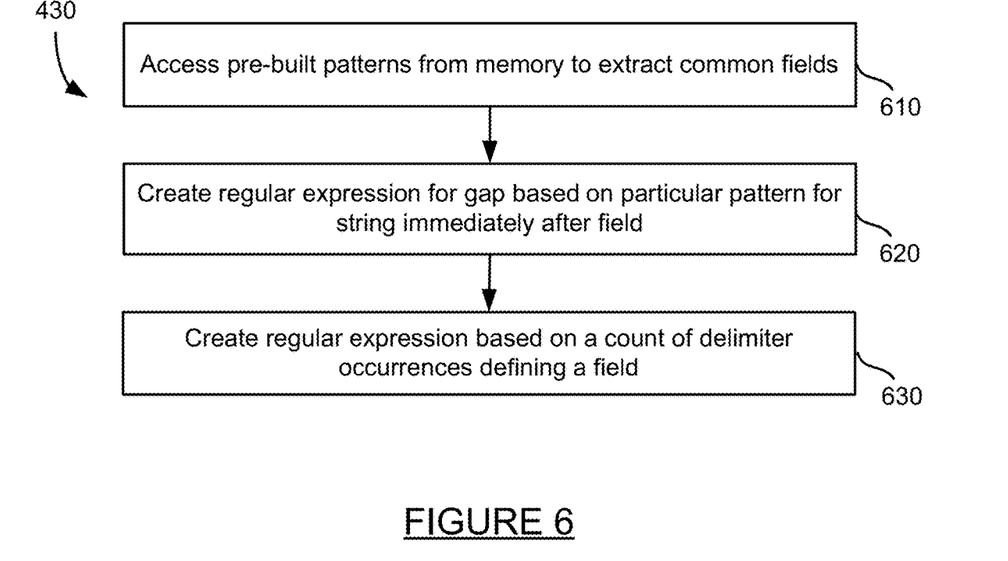
FIG. 6 is an exemplary method for creating multiple instances of a regular expression portion to represent a field.

FIG. 6 is an examplary method for creating multiple instances of a regular expression portions to represent a field. The method of FIG. 6 provides more detail for step 430 of the method of FIG. 3. Prebuilt patterns may be accessed from memory by the controller to extract common fields at step 610. The common fields to extract may include a date, URL, and other common fields found in log lines. Regular expressions may also be created for a particular field based on a particular pattern of a string immediately after the field at step 620. Similar to gaps, a particular string of characters that follows a particular field may be used to generate a regular expression for each field in a log line that contains a field selected by a user. A regular expression may also be created based on a count of delimiter occurrences that define a particular field at step 630. Similar to that discussed with respect to gaps, for each field identified by a user, the number of delimiters that occur before the field may be used to create a regular expression.

Per the methods of FIGS. 5 and 6, for each gap and field there may exist a list of regular expression portions. The regular expression portions can be combined into a complete regular expression that will be used to extract desired data from log lines. In constructing the complete regular expression, the regular expression portion lists are processed to identify an acceptable combination.

Figure 7:
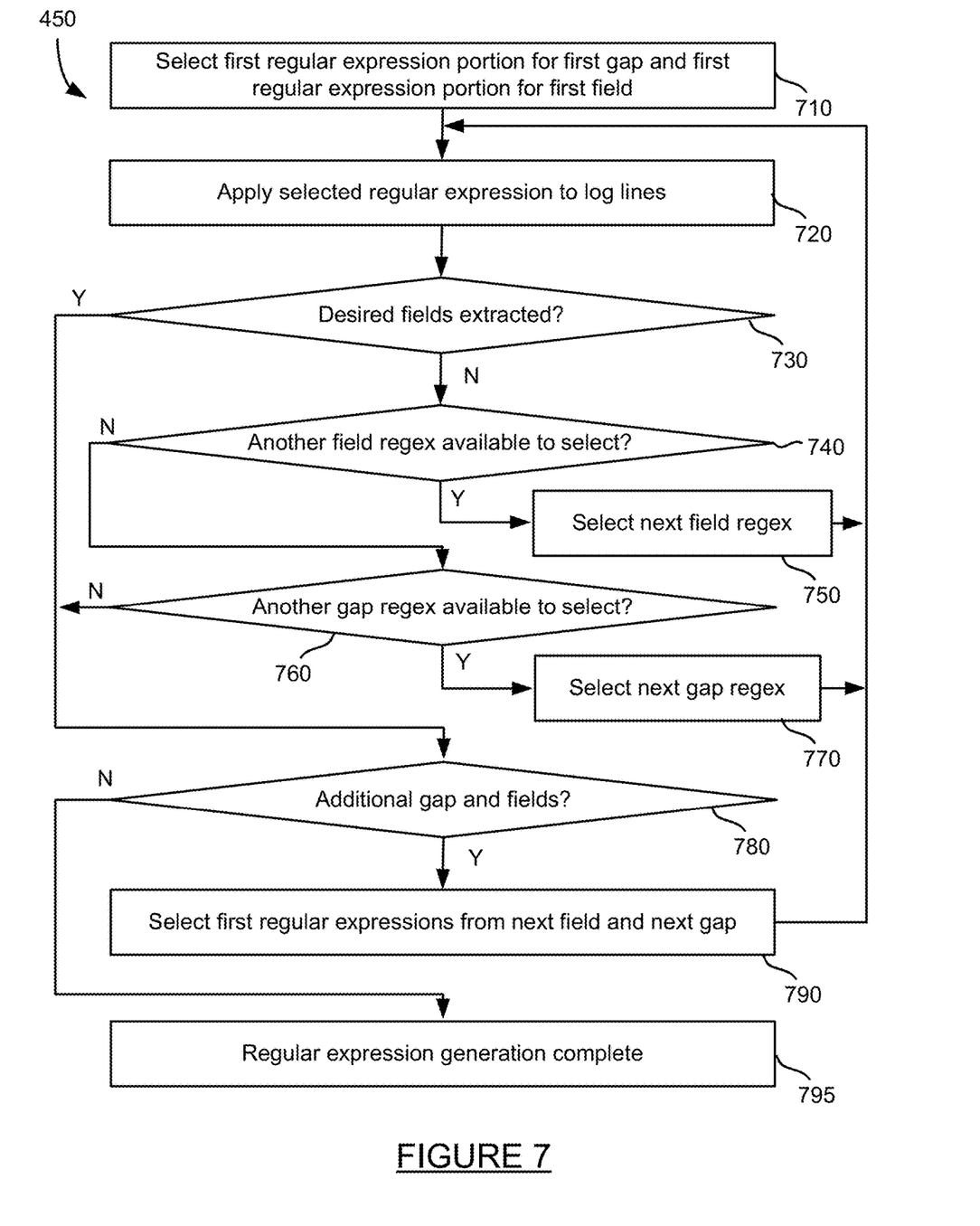
FIG. 7 is an exemplary method for constructing a full regular expression.

FIG. 7 is an examplary method for constructing a full regular expression. The method of FIG. 7 provides more detail for step 450 of the method of FIG. 4. First, a first regular expression portion for a first gap any first regular expression portion for a first field may be selected at step 710. The selected regular expression, a combination of the first regular expression portion for the first gap and the first regular expression portion for the first field, is applied to log lines at step 720. After applying the regular expression combination to log lines, a determination is made as to whether fields extracted from those log lines match the field identified by a user to be extracted. When the fields to be extracted do match the actual fields extracted by the combination of regular expression portions, the method of FIG. 7 continues to step 780.

When the desired fields are not extracted using the regular expression combination, a determination is made as to whether another first regular expression is available to be selected at step 740. When determined that another regular expression is available to be selected, the next regular expression field in the list of regular expressions for the first field is selected at step 750 and the method of FIG. 7 returns to step 720 where the new combination of the second regular expression for the first field and the first regular expression for the first gap is applied to the log lines at step 720. When no additional field registered expression is available to be selected, a determination is made as to whether another regular expression for a gap is available to select at step 760. When another gap registered expression is available, the available gap registered expression is selected at step 770 and the method of FIG. 7 returns to step 720. When no additional regular expression for a gap is available to select at step 760, the method of FIG. 7 continues to step 780.

A determination is made as to whether there are additional gaps in fields to combine at step 780. When additional gaps in fields are available to be combined, the first regular expressions from the next field and next gap are selected at step 790 and the method of FIG. 7 returns to step 720 where the current combination of regular expression portions is applied to log lines. Note that after the first regular expressions from the next field the next gap are selected at step 790, the combination of regular expression portions may include a selected regular expression for a first gap in a first field as well as a selected regular expression from a second gap and a second field. When there are no additional gaps in fields at step 780, the regular depression generation process is complete at step 795.

Figure 12:
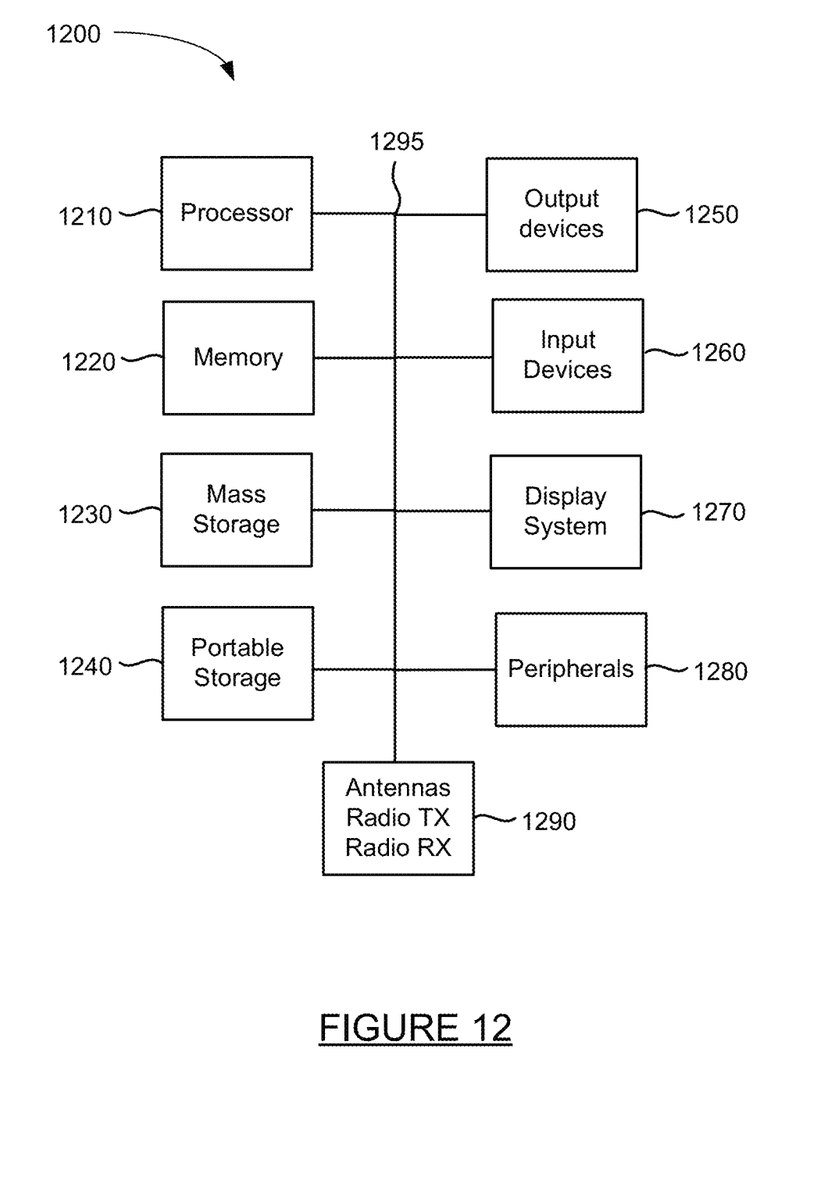
FIG. 12 is an exemplary block diagram of a computing environment for implanting the present technology.

FIG. 12 is an exemplary block diagram of a computing environment for implementing the present technology. System 1200 of FIG. 12 may be implemented in the contexts of the likes of client computer 130, 205 and 292, servers 110, 120, 125, 225, 230, 240, 250, and 260, machine 270, data stores 280 and 290, and controller 290. The computing system 1200 of FIG. 12 includes one or more processors 1210 and memory 1220. Main memory 1220 stores, in part, instructions and data for execution by processor 1210. Main memory 1220 can store the executable code when in operation. The system 1200 of FIG. 12 further includes a mass storage device 1230, portable storage medium drive(s) 1240, output devices 1250, user input devices 1260, a graphics display 1270, and peripheral devices 1280.

The components shown in FIG. 12 are depicted as being connected via a single bus 1290. However, the components may be connected through one or more data transport means. For example, processor unit 1210 and main memory 1220 may be connected via a local microprocessor bus, and the mass storage device 1230, peripheral device(s) 1280, portable storage device 1240, and display system 1270 may be connected via one or more input/output (I/O) buses.

Mass storage device 1230, which may be implemented with a magnetic disk drive, an optical disk drive, a flash drive, or other device, is a non-volatile storage device for storing data and instructions for use by processor unit 1210. Mass storage device 1230 can store the system software for implementing embodiments of the present invention for purposes of loading that software into main memory 1220.

Portable storage device 1240 operates in conjunction with a portable non-volatile storage medium, such as a floppy disk, compact disk or Digital video disc, USB drive, memory card or stick, or other portable or removable memory, to input and output data and code to and from the computer system 1200 of FIG. 12. The system software for implementing embodiments of the present invention may be stored on such a portable medium and input to the computer system 1200 via the portable storage device 1240.

Input devices 1260 provide a portion of a user interface. Input devices 1260 may include an alpha-numeric keypad, such as a keyboard, for inputting alpha-numeric and other information, a pointing device such as a mouse, a trackball, stylus, cursor direction keys, microphone, touch-screen, accelerometer, and other input devices Additionally, the system 1200 as shown in FIG. 12 includes output devices 1250. Examples of suitable output devices include speakers, printers, network interfaces, and monitors.

Display system 1270 may include a liquid crystal display (LCD) or other suitable display device. Display system 1270 receives textual and graphical information, and processes the information for output to the display device. Display system 1270 may also receive input as a touch-screen.

Peripherals 1280 may include any type of computer support device to add additional functionality to the computer system. For example, peripheral device(s) 1280 may include a modem or a router, printer, and other device.

The system of 1200 may also include, in some implementations, antennas, radio transmitters and radio receivers 1290. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth devices, and other radio frequency networks. The devices may include one or more radio transmitters and receivers for processing signals sent and received using the antennas.

The components contained in the computer system 1200 of FIG. 12 are those typically found in computer systems that may be suitable for use with embodiments of the present invention and are intended to represent a broad category of such computer components that are well known in the art. Thus, the computer system 1200 of FIG. 12 can be a personal computer, hand held computing device, smart phone, mobile computing device, workstation, server, mini-computer, mainframe computer, or any other computing device. The computer can also include different bus configurations, networked platforms, multi-processor platforms, etc. Various operating systems can be used including Unix, Linux, Windows, iOS, Android, C, C++, Node.JS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for automatically generating a regular expression from log line data, comprising:
   identifying, by an application on a server, a portion of a log line in the log line data;
   automatically generating, by the application on the server, multiple instances of multiple portions of a regular expression based on the identified portion, the multiple instances of multiple portions of the regular expression including:
   at least one regular expression generated that represents a field within the portion of the log line, and
   at least one regular expression that represents a gap within the portion of the log line, where the at least one regular expression that represents the gap is generated by identifying starting patterns and ending patterns of the gap, a particular pattern for a string immediately after the gap, or a count of delimiter occurrences defining the gap;
   automatically generating, by the application on the server, a complete regular expression from one or more of the generated multiple instances; and
   retrieving, by the application on the server, subsequent log lines based on the automatically generated complete regular expression.

2. The method of claim 1, wherein identifying includes receiving user input indicative of the portion of a log line.

3. The method of claim 2, wherein the received user input identifies a field in the indicated portion of the log line.

4. The method of claim 1, wherein generating multiple instances includes:
   generating at least one of the multiple instances of the multiple portions of the regular expressions for each of a plurality of gaps in the log line based on the identified portion; and
   generating at least one of the multiple instances of the multiple portions of the regular expressions for each of a plurality of fields in the log line based on the identified portion.

5. The method of claim 4, wherein automatically generating a regular expression includes generating a regular expression based on multiple instances of the regular expression portion for a single gap and multiple instances of the regular expression portion for a single field.

6. The method of claim 5, further comprising receiving user input to modify the automatically generated regular expression based on receipt of a subsequent user input.

7. The method of claim 1, further comprising receiving user input to modify the automatically generated regular expression based on receipt of a subsequent user input.

8. A non-transitory computer readable storage medium having embodied thereon a program, the program being executable by a processor to perform a method for automatically generating a regular expression from log line data, the method comprising:
   identifying, by an application on a server, a portion of a log line in the log line data;
   automatically generating, by the application on the server, multiple instances of multiple portions of a regular expression based on the identified portion, the multiple instances of multiple portions of the regular expression including:
   at least one regular expression generated that represents a field within the portion of the log line, and
   at least one regular expression that represents a gap within the portion of the log line, where the at least one regular expression that represents the gap is generated by identifying starting patterns and ending patterns of the gap, a particular pattern for a string immediately after the gap, or a count of delimiter occurrences defining the gap;
   automatically generating, by the application on the server, a complete regular expression from one or more of the generated multiple instances; and
   retrieving, by the application on the server, subsequent log lines based on the automatically generated complete regular expression.

9. The non-transitory computer readable storage medium of claim 8, wherein identifying includes receiving user input indicative of the portion of a log line.

10. The non-transitory computer readable storage medium of claim 9, wherein the received user input identifies a field in the indicated portion of the log line.

11. The non-transitory computer readable storage medium of claim 8, wherein generating multiple instances includes:

generating at least one of the multiple instances of the multiple portions of the regular expressions for each of a plurality of gaps in the log line based on the identified portion; and generating at least one of the multiple instances of the multiple portions of the regular expressions for each of a plurality of fields in the log line based on the identified portion.

12. The non-transitory computer readable storage medium of claim 11, wherein automatically generating a regular expression includes generating a regular expression based on multiple instances of the regular expression portion for a single gap and multiple instances of the regular expression portion for a single field.

13. The non-transitory computer readable storage medium of claim 12, further comprising receiving user input to modify the automatically generated regular expression based on receipt of a subsequent user input.

14. The non-transitory computer readable storage medium of claim 8, further comprising receiving user input to modify the automatically generated regular expression based on receipt of a subsequent user input.

15. A system for automatically generating a regular expression from log line data, comprising:
   a server including a memory and a processor; and
   one or more modules stored in the memory and executed by the processor to:
      identify a portion of a log line in the log line data,
      automatically generate multiple instances of multiple portions of a regular expression based on the identified portion, the multiple instances of multiple portions of the regular expression including:
         at least one regular expression generated that represents a field within the portion of the log line, and
         at least one regular expression that represents a gap within the portion of the log line, where the at least one regular expression that represents the gap is generated by identifying starting patterns and ending patterns of the gap, a particular pattern for a string immediately after the gap, or a count of delimiter occurrences defining the gap,
      automatically generate a complete regular expression from one or more of the generated multiple instances, and
      retrieve subsequent log lines based on the automatically generated complete regular expression.

16. The system of claim 15, wherein identifying includes receiving user input indicative of the portion of a log line.

17. The system of claim 16, wherein the received user input identifies a field in the indicated portion of the log line.

18. The system of claim 15, wherein the one or more modules are further executable to generate at least one of the multiple instances of the multiple portions of the regular expressions for each of a plurality of gaps in the log line based on the identified portion, and generate at least one of the multiple instances of the multiple portions of the regular expressions for each of a plurality of fields in the log line based on the identified portion.

19. The system of claim 18, wherein generating a regular expression includes generating a regular expression based on multiple instances of the regular expression portion for a single gap and multiple instances of the regular expression portion for a single field.

20. The system of claim 19, wherein the one or more modules are further executable to receive user input to modify the automatically generated regular expression based on receipt of a subsequent user input.

21. The system of claim 15, wherein the one or more modules are further executable to receive user input to modify the automatically generated regular expression based on receipt of a subsequent user input.

* * * * *